(12) United States Patent
Schuller

(10) Patent No.: US 6,171,083 B1
(45) Date of Patent: Jan. 9, 2001

(54) PISTON PUMP

(75) Inventor: Wolfgang Schuller, Sachsenheim (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/228,188

(22) Filed: Jan. 11, 1999

(30) Foreign Application Priority Data

Jan. 9, 1998 (DE) .............................................. 198 00 500

(51) Int. Cl.⁷ .................................................. F04B 53/12
(52) U.S. Cl. .......................................... 417/549; 92/171.1
(58) Field of Search .......................... 92/171.1; 417/549, 417/470, 554

(56) References Cited

U.S. PATENT DOCUMENTS

| | | |
|---|---|---|
| 3,446,156 | 5/1969 | Lightfoot . |
| 4,685,384 * | 8/1987 | Dirkin et al. ............................ 92/166 |
| 4,722,664 * | 2/1988 | Wissman ................................ 415/197 |
| 5,100,305 | 3/1992 | Zirps . |
| 5,213,482 | 5/1993 | Reinartz et al. . |
| 5,232,273 | 8/1993 | Eckstein et al. . |
| 5,320,498 * | 6/1994 | Fuchida ................................. 417/214 |
| 5,567,135 * | 10/1996 | Mueller et al. ....................... 417/549 |

FOREIGN PATENT DOCUMENTS

| | | |
|---|---|---|
| 4240518 * | 6/1994 | (DE) . |
| 1 95 10745 A1 | 9/1996 | (DE) . |
| 0 637 690 A1 | 2/1995 | (EP) . |

* cited by examiner

Primary Examiner—Edward K. Look
Assistant Examiner—Thomas E. Lazo
(74) Attorney, Agent, or Firm—Ronald E. Greigg; Edwin E. Greigg

(57) ABSTRACT

The invention relates to a piston pump with a piston, which is guided so that the piston can move axially in a liner that has been inserted into a pump housing and is driven into a reciprocating stroke motion by means of a cam that is driven to rotate. The invention uses a liner that is manufactured as an injection-molded plastic part. The plastic liner has advantages with regard to manufacture, damping behavior when there are pressure changes, and noise generation. Furthermore, the invention proposes affixing a filter integral with the liner when the liner is injection molded.

13 Claims, 2 Drawing Sheets

PISTON PUMP

BACKGROUND OF THE INVENTION

The invention relates to a piston pump, for use in a hydraulic vehicle brake system.

Piston pumps of this kind are known in and of themselves. They have a for example cylindrical piston, which is guided so that it can move axially in a liner. The liner can be of one piece with a liner bottom on its one end face. The liner in known piston pumps is comprised of steel and is produced by machining or also by shaping, for example by cold pressing. The liner is inserted into a pump housing. A cam drive, for example, can be provided for driving the piston into a reciprocating stroke motion. It is also possible to guide the piston so that it can move axially in a pump housing without a liner. In this instance, the pump housing is comprised of steel. When a liner is used, the pump housing is frequently made of die-cast aluminum.

OBJECT AND SUMMARY OF THE INVENTION

The pump piston according to the invention, has a plastic liner or, if the piston is guided directly in the pump housing, has a plastic pump housing made. If there is a liner, then the pump housing can likewise be made of plastic or for example can also be made of die-cast aluminum or also of steel. A liner made of plastic or a pump housing made of plastic, i.e. making the part of the piston pump that axially guides the piston out of plastic, yields a considerable cost advantage over the manufacture of this part put of steel. Another advantage is the elimination of work cycles that are required when the part that guides the piston is made of steel, for example machining and/or shaping surface work of a running surface that guides the piston and belongs to the part guiding the piston, or the production of undercuts, recesses, or openings. Moreover, favorable sliding properties of the plastic with low friction and low wear are produced, as well as an elastic behavior of the liner that is improved in relation to steel. The improved elastic behavior has the advantage that for example an inlet or outlet valve of the piston pump, which valve is embodied as a check valve, whose valve seat is disposed on a liner bottom, seals better and closes faster. Furthermore, a striking of a valve closing body against the valve seat is damped when a valve of this kind closes, which reduces noise generation and wear. In addition, the plastic liner or plastic pump housing, by virtue of its elastic behavior, damps pressure vibrations, pressure pulsations, and pressure peaks that are caused by the discontinuous manner in which the piston pump feeds. Another advantage of the manufacture of the part guiding the piston out of plastic is the possibility of producing virtually any geometry desired. As a result, points of the part guiding the piston that are acted on by the flowing fluid during the fluid delivery by means of the piston pump, i.e. for example an inflow region and an outflow region, can be embodied using flow technology with a view to low noise generation and low flow resistance.

According to the invention, the liner is of one piece with a filter. This has the advantage that no separate filter is required, which saves on both manufacturing costs and assembly expenditures. Another advantage is that with an equal length of the liner, a filter surface can be embodied as larger as a result of the one-piece embodiment than with a liner that has a filter placed onto it.

In one embodiment of the invention the liner has a valve seat part so that the valve seat can be simply embodied in a wear resistant manner. The valve seat part can be made of one piece with the liner, for example by means of injection molding it with the plastic that constitutes the liner.

In another embodiment of the invention the liner has a reduced diameter in an axially defined region which, together with a pump bore of the pump housing into which the liner is inserted, constitutes an annular conduit encompassing the liner. An inflow or outflow of the piston pump according to the invention takes place by means of this annular conduit. The annular conduit has the advantage that it assures an inflow or outflow of the piston pump independent of an angular position in which the liner is inserted into the pump housing; therefore, the angular alignment does not have to be observed when installing the liner into the pump housing. Embodying the annular conduit by means of a diameter narrowing of the liner has the advantage that a diameter widening of the pump bore in the pump housing does not have to be embodied, for example by means of turning, which would bring about a considerable manufacturing expense.

The piston pump according to the invention is provided in particular as a pump in a brake system of a vehicle and is used in the control of the pressure in wheel brake cylinders. Depending on the type of brake system, the abbreviations ABS, ASR, FDR, or EHB are used for brake systems of this kind. In the brake system, the pump is used, for example, to return brake fluid from a wheel brake cylinder or from a number of wheel brake cylinders into a master cylinder (ABS) and/or to feed brake fluid from a reservoir into a wheel brake cylinder or a number of wheel brake cylinders (ASR, FDR, or EHB). The pump is required, for example, in a brake system with a wheel slip regulation (ABS or ASR) and/or in a brake system used as a steering aid (FDR), and/or in an electrohydraulic brake system (EHB). With the wheel slip regulation (ABS or ASR), for example a locking of the wheels of the vehicle can be prevented during a braking operation when there is a powerful pressure on the brake pedal (ABS) and/or an excess rotation of the driven wheels of the vehicle can be prevented when there is a powerful pressure on the gas pedal (ASR). In a brake system used as a steering aid (FDR) a brake pressure is built up in one or more wheel brake cylinders independent of an actuation of the brake pedal or gas pedal in order, for example, to prevent the vehicle from swerving off the track desired by the driver. The pump can also be used in an electrohydraulic brake system (EHB) in which the pump feeds the brake fluid into the wheel brake cylinder or cylinders when an electrical brake pedal sensor detects an actuation of the brake pedal or in which the pump is used to fill a reservoir of the brake system.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
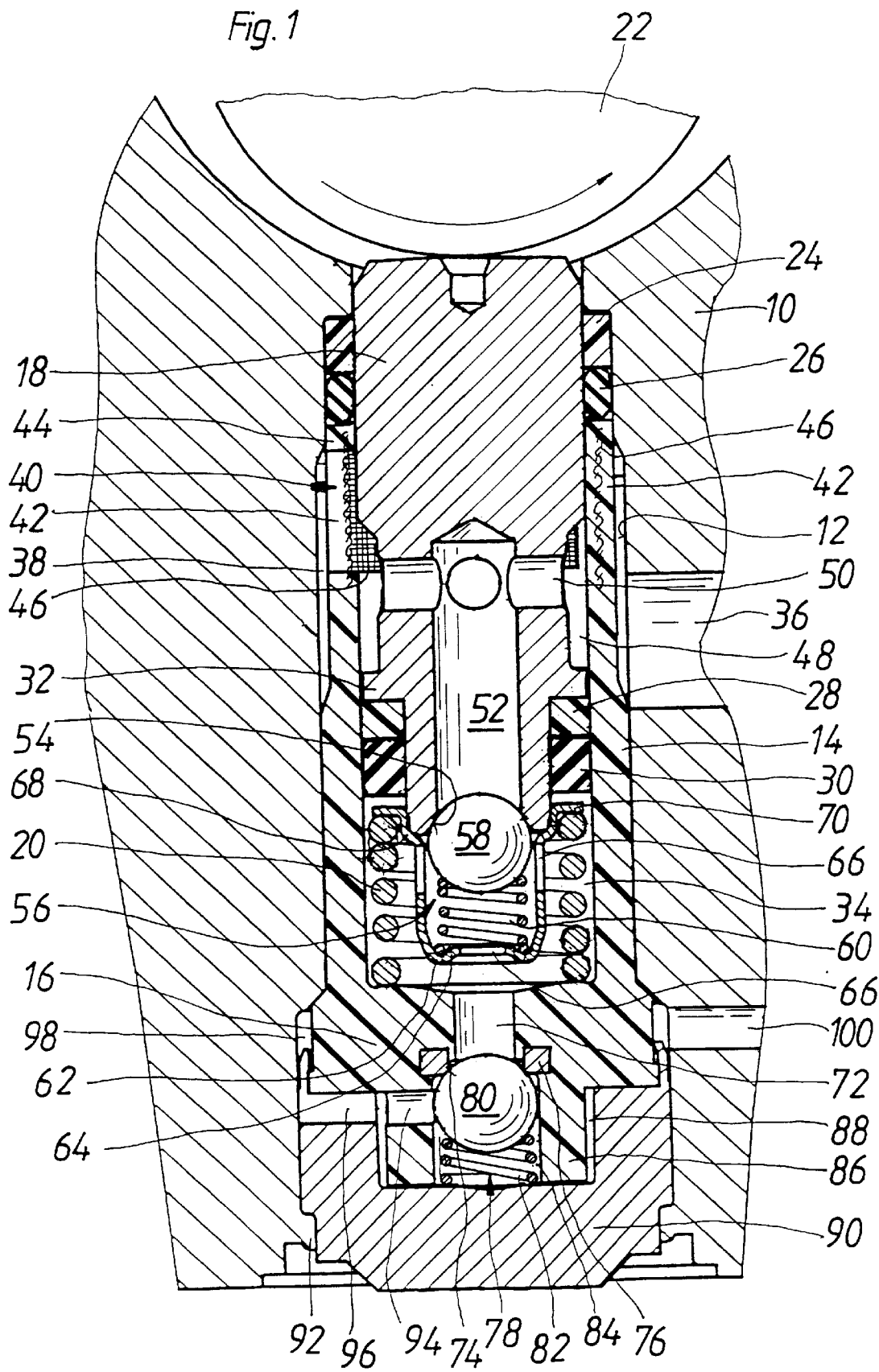
FIG. 1 shows an axial section through a piston pump according to the invention.

The piston pump according to the invention, which is depicted in FIG. 1, is inserted into a hydraulic block 10, of which only a fragment encompassing the piston pump is shown in the drawing for the sake of clarity. The hydraulic block 10 is part of an otherwise not shown hydraulic, slip-regulated vehicle brake system. Other hydraulic components of the vehicle brake system, such as solenoid valves, are inserted into the hydraulic block 10 and are hydraulically connected to one another and to the piston pump. The hydraulic block 10 is hydraulically connected to a master cylinder, not shown; wheel brake cylinders, not shown, are hydraulically connected to the hydraulic block 10. The hydraulic block 10 constitutes a pump housing of the piston pump and is indicated as such below.

The pump housing 10 is comprised of metal, preferably of die-cast aluminum. A continuous stepped pump bore 12 is let into the pump housing 10 and a liner 14 is inserted into this bore. The liner 14 is a hollow, cylindrical plastic injection-molded part with a liner bottom 16 on its one end that is of one piece with it. The addition of TEFLON produces favorable sliding properties of the liner 14 and improves the sliding properties of the plastic which the liner 14 is made of. The plastic comprising the liner 14 has carbon fibers which increase the stability of the liner 14 and improve a wear behavior of the liner 14. An essentially cylindrical piston 18 is guided so that it can move axially in the liner 14. The piston 18 is pressed out of the liner 14, away from the liner bottom 16, by a piston restoring spring 20 that is inserted into the liner 14 and is supported on the liner bottom 16. A cam 22 that can be driven to rotate by an electric motor is disposed on a side of the piston 18 remote from the liner bottom 16 and the piston restoring spring 20 presses the piston 18 against the circumference of this cam. The rotating drive of the cam 22 drives the piston 18 into a reciprocating stroke motion in the liner 14.

An end of the piston 18 oriented toward the cam 22 is guided with a guide ring 24 so that it can move axially in the pump housing 10; a sealing ring 26 disposed axially adjacent to the guide ring 24 creates a seal between the piston 18 and the pump housing 10. The guide ring 24 and the sealing ring 26 are inserted into the extension of the liner 14 into the pump bore 12.

An end of the piston 18 that is disposed remote from the cam 22 in the liner 14 is guided with a guide ring 28 so that it can move axially in the liner 14; a sealing ring 30 produces a seal between the piston 18 and the liner 14. The piston 18 narrows at an annular step 32 in the direction of the liner bottom 16. The annular step 32 is used for the axial contact of the guide ring 28 and the sealing ring 30, which are slid onto the narrowed end of the piston 18.

The piston 18 with the sealing ring 30 slid onto it encloses a displacement chamber 34 in the liner 14 between its end oriented toward the liner bottom 16 and the liner bottom 16 itself. A reciprocating stroke motion of the piston 18 increases and decreases a volume of the displacement chamber 34 and as a result, feeds fluid in a manner that is intrinsically known from piston pumps.

For the entry into the piston pump of fluid to be fed, an inlet bore 36 is let into the pump housing 10 radial to the pump bore 12 and this inlet bore feeds into the pump bore 12. The inlet bore 36 feeds into an annular conduit which encompasses the liner 14 and is enclosed between an outer circumference of the liner 14 and the pump housing 10 and is part of the pump inlet. The annular conduit 38 extends in the axial direction from the inlet bore 36 into the vicinity of the open end of the liner 14 oriented toward the cam 22. The annular conduit 38 is formed by means of a diameter narrowing of the liner 14 in the direction from the liner bottom 16 toward the cam 22 and by means of a narrowing of the pump bore 12 in the vicinity of the open end of the liner 14. In terms of the axial direction, the annular conduit 38 is disposed outside the displacement chamber 34 of the piston pump. In the region of the displacement chamber 34, the liner 14 rests against the pump housing 10 with its entire surface so that in the region of the displacement chamber 34 in which high pressure can be produced during the operation of the piston pump, the liner 14 is supported over its entire surface by the pump housing 10.

On its open end, the liner 14 is provided with filter windows 40 in the form of openings that pass through its wall and are separated from one another in the circumference direction by means of filter ribs 42 extending in the longitudinal direction of the liner 14 and are defined in the axial direction by an end ring 44. The filter ribs 42 and the end ring 44 are made to be of one piece with the liner 14 by means of injection molding. In the region of the filter windows 40, a tubular filter cloth 46 is non-detachably connected to the liner 14 by means of injection molding with the plastic that constitutes the liner 14 during the manufacture of the liner 14. The filter cloth 46 or a filter that contains the filter cloth 46, the filter ribs 42, and the end ring 44 is consequently of one piece with the liner 14. The filter cloth 46 completely covers the filter windows 40 so that no fluid to be fed can flow unfiltered into the piston pump. The filter windows 40 are disposed in the region of the annular conduit 38 enclosed between the liner 14 and the pump housing 10. The filter ribs 42 and the end ring 44 are flush with an inner circumference of the liner 14 so that the filter ribs 42 and the end ring 44, as well as the liner 14 over its remaining length, are in a position to guide the piston 18 so that it can move axially.

From the filter windows 40, the fluid inlet of the piston pump continues on by means of a circumferential groove 48 in the piston 18 into transverse bores 50, which are let into the piston 18 so that they cross each other in the region of the groove 48. The transverse bores 50 cross an axial blind bore 52 of the piston 18 at the bottom of the blind bore 52. The blind bore 52 extends outwardly, forming a conical valve seat 54 at an end face of the piston 18 that defines the displacement chamber 34.

The valve seat 54 embodied on the piston 18 is part of an inlet valve 56 of the piston pump that is embodied as a spring-loaded check valve: a valve ball 58 acting as a valve closing body of the inlet valve 56, is pressed against the valve seat 54 by a helical compression spring acting as a valve closing spring 60. The valve closing spring 60 and the valve ball 58 are contained in a bowl-shaped valve retainer 62, which is produced as a deep-drawn part out of sheet metal. The valve closing spring 60 is supported against a bottom 64 of the valve retainer 62. Through flow openings 66 are let into the circumference and the bottom 64 of the valve retainer 62. With an annular step-shaped widening 66 on its open end, the valve retainer 62 is attached to the end of the piston 18 oriented toward the displacement chamber 34. A free edge of the valve retainer 62 is shaped so that it protrudes radially outward to a spring plate 70. The piston restoring spring 20 presses against the spring plate 70 and by way of this, presses the piston 18 into contact with the circumference of the cam 22. At the same time, the piston restoring spring 20 holds the valve retainer 62 against the piston 18 by way of its spring plate 70. The piston restoring spring 20 is embodied as considerably stronger than the valve closing spring 60 of the inlet valve 56 so that the piston restoring spring 20 holds the valve retainer 62 securely against the end of the piston 18 oriented toward the displacement chamber 34 counter to the force of the valve closing spring 60 at all loads that occur during the operation of the piston pump.

A fluid outlet from the displacement chamber 34 of the piston pump takes place by means of a center opening 72 in the liner bottom 16. On an end remote from the displacement chamber 34, i.e. on the outside of the liner bottom 16, a valve seat 74 is embodied that belongs to an outlet valve 78 of the piston pump. The valve seat 74 is embodied on a ring that forms a valve seat part 76, which is injection molded so that it concentrically encompasses the center opening 72 and is made of the plastic that constitutes the liner bottom 16. An inner circumferential edge of the valve seat part 76 is rounded and is embodied as a valve seat 74.

An outlet valve 78 is embodied as a spring-loaded check valve. The outlet valve 78 has a valve ball 80 as its valve closing body, which is pressed against the valve seat 74 by a helical compression spring acting as a valve closing spring 82. The valve closing spring 82 and valve ball 80 are contained in a widened section 84 of the center opening 72.

The widened section 84 of the center opening 72 is disposed in a pin-like extension 86, which is of one piece with the liner 14 and protrudes from the outside of the liner bottom 16. The pin-like extension 86 protrudes with a smaller dimension into a countersink 88 of a cylindrical closing part 90, wherein the valve closing spring 82 of the outlet valve 78 is supported on the bottom of the countersink 88. The closing part 90 is inserted into an end of the pump bore 12 remote from the cam 22 and is held in the pump bore 12 by means of a circumferential caulking 92 of the pump housing 10. The caulking 92 produces a pressure tight sealing of the pump bore 12 on its end remote from the cam 22. A fluid outlet from the widened section 84 of the center opening 72 takes place by means of a radial opening 94 in the pin-like extension 86 and continues on from there by means of a radial groove 96 in the closure part 90 into an annular conduit 98 that encompasses the liner bottom 16 and is enclosed between it and the pump housing 10. Fluid supplied by the piston pump from the annular conduit 98 flows through a radial outlet bore 100 in the pump housing 10.

Figure 2:
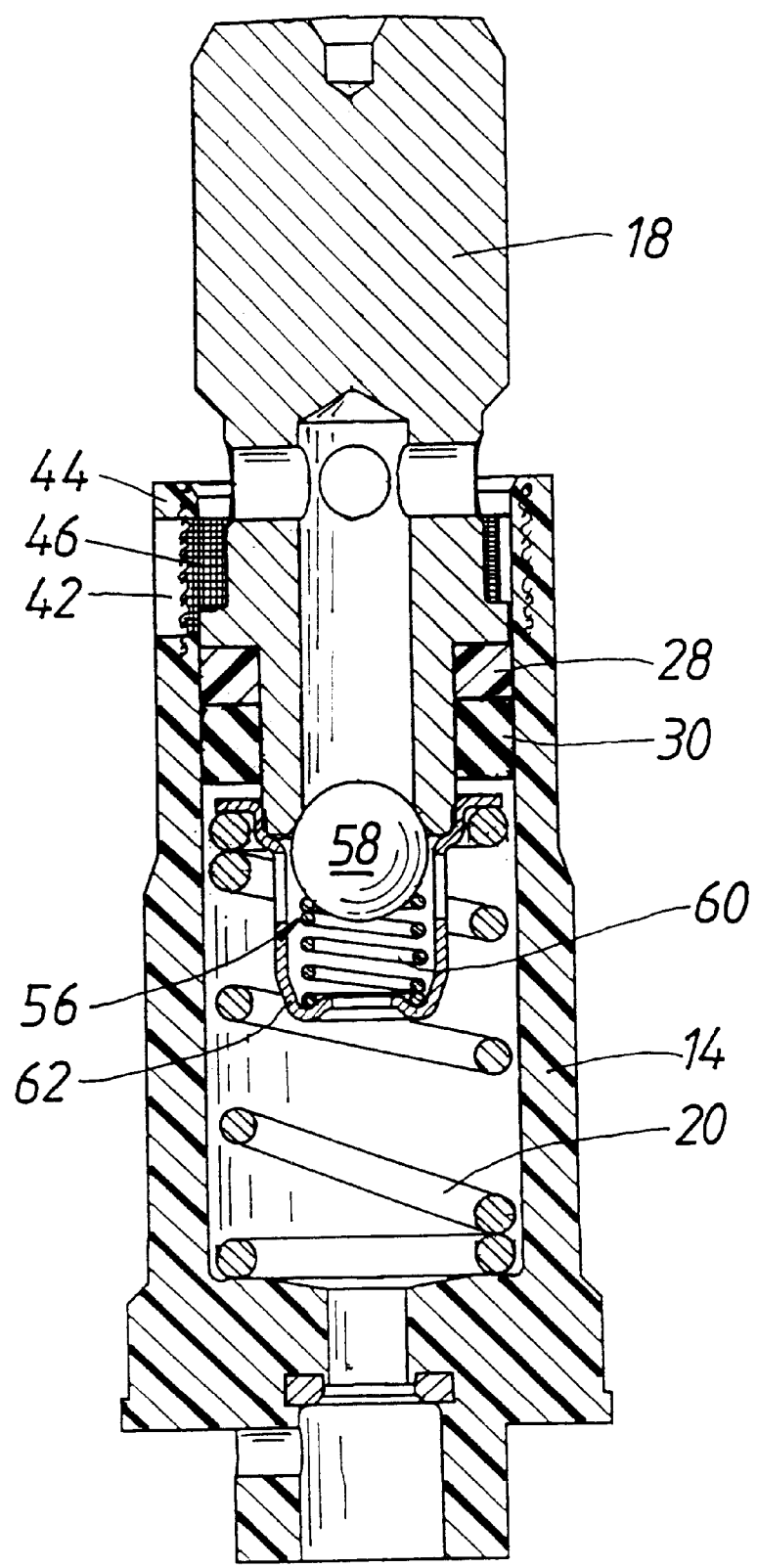
FIG. 2 shows an axial section through a subassembly of the piston pump from FIG. 1.

For the assembly of the piston pump, first the piston restoring spring 20 is inserted into the liner 14 and then the piston 18, onto which the guide ring 28 and the sealing ring 30 have been slid and to which the valve retainer 62 with the valve spring 60 and the valve ball 58 has been attached, is inserted into the liner 14, as shown in FIG. 2. This produces a subassembly of the piston pump which essentially includes the piston 18 with the guide ring 28 and the sealing ring 30, the inlet valve 56, and the piston restoring spring 20. In the position of the piston 18 in the liner 14 shown in FIG. 2, the piston restoring spring 20 is completely relaxed. When the piston restoring spring 20 is completely relaxed, the piston 18 is guided in the liner 14, in its filter ribs 42, and/or in its end ring 44, i.e. the piston restoring spring 20 does not press the piston 18 out from the liner 14 provided that the subassembly is not yet inserted into the pump housing 10 in which the cam 22 holds the piston 18 in the liner 14 counter to the force of the piston restoring spring 20. Since the filter ribs 42 and/or the end ring 44 of the filter 42, 44, 46, which are of one piece with the liner 14, thus guide the piston 18 in the liner 14, the liner 14, including its filter 42, 44, 46, can be embodied as short in the axial direction. A subassembly is obtained that can be favorably manipulated until the insertion into the pump bore 12. After the assembly of the subassembly, it is inserted into the pump bore 12 of the pump housing 10 and the pump bore 12 is closed with the closing part 90 by affixing the caulking 92.

The foregoing relates to preferred exemplary embodiments of the invention, it being understood that other variants and embodiments thereof are possible within the spirit and scope of the invention, the latter being defined by the appended claims.

I claim:

1. A piston pump for a hydraulic motor vehicle brake system, which comprises a pump housing in which a piston is contained so that the piston moves axially and is driven in an axially reciprocating stroke motion, a liner (14) that axially guides the piston (18) is a plastic liner, plastic liner (14) is inserted into the pump housing (10) and guides the piston (18) so that the piston can move axially, and the liner (14) has a filter (42, 44, 46) that is non-detachably connected to the liner.

2. A piston pump according to claim 1, in which the plastic part (14) that axially guides the piston (18) contains components of TEFLON.

3. A piston pump according to claim 1, in which the liner (14) has a liner bottom (16) and that the liner bottom (16) includes a valve seat (74) of an inlet or outlet valve (78) of the piston pump.

4. The piston pump according to claim 1, in which the liner (14) has a valve seat part (76).

5. The piston pump according to claim 4, in which the valve seat part (76) is integral with the liner (14).

6. The piston pump according to claim 1, in which the plastic part that guides the piston (18) is an injection-molded part.

7. A piston pump for a hydraulic motor vehicle brake system, which comprises a pump housing in which a piston is contained so that the piston moves axially and is driven in an axially reciprocating stroke motion, a liner (14) that axially guides the piston (18) is a plastic part, and the plastic part (14) that axially guides the piston (18) has carbon fibers added within the plastic.

8. A piston pump according to claim 7, in which the part (14) of the piston pump is a plastic liner (14) which is inserted into the pump housing (10) and guides the piston (18) so that the piston can move axially.

9. A piston pump according to claim 7, in which the plastic part (14) that axially guides the piston (18) contains components of TEFLON.

10. A piston pump according to claim 8, in which the plastic part (14) that axially guides the piston (18) contains components of TEFLON.

11. A piston pump according to claim 7, in which the plastic part (14) that axially guides the piston (18) contains components of TEFLON.

12. A piston pump for a hydraulic motor vehicle brake system, which comprises a pump housing in which a piston is contained so that the piston moves axially and is driven in an axially reciprocating stroke motion, a liner (14) that axially guides the piston (18) is a plastic liner, the plastic liner (14) is inserted into the pump housing (10) and guides the piston (18) so that the piston can move axially, the liner (14) has a liner bottom (16) and that the liner bottom (16) includes a valve seat (74) of an outlet valve (78) of the piston pump, and a filter (42, 44, 46) is disposed on a circumference of the liner (14) and that the liner (14) has a narrowing of an outer circumference, which is defined in an axial direction, in a region of the filter (42, 44, 46), said narrowing, together with the pump housing (10) constitutes an annular conduit (38), which encompasses the liner (14) and is part of a pump outlet.

13. The piston pump according to claim 3, in which the liner (14) has a valve seat part (76).

* * * * *